(12) United States Patent
Kennedy et al.

(10) Patent No.: US 6,909,885 B2
(45) Date of Patent: Jun. 21, 2005

(54) RF MODULATOR AND SWITCH HAVING HIGH ANTENNA ISOLATION

(75) Inventors: John Francis Kennedy, Dearborn, MI (US); Edmund Joe Tillo, Belleville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 415 days.

(21) Appl. No.: 10/301,149

(22) Filed: Nov. 21, 2002

(65) Prior Publication Data

US 2004/0102171 A1 May 27, 2004

(51) Int. Cl.[7] .................................................. H04B 1/38
(52) U.S. Cl. ........................ 455/289; 455/82; 455/83; 455/133; 455/266; 333/103; 333/104
(58) Field of Search .............................. 455/66.1, 67.1, 455/42, 250.1, 321–325, 333–335, 289, 280, 281, 287, 309, 3.02, 11.1, 525, 267–268, 344, 345, 266, 82–83, 132–133; 333/103–104, 134–176, 17; 381/79, 86, 106, 1–10

(56) References Cited

U.S. PATENT DOCUMENTS

| | | | |
|---|---|---|---|
| 5,319,716 A | | 6/1994 | McGreevy |
| 5,970,390 A | * | 10/1999 | Koga et al. .................... 455/42 |
| 6,535,719 B1 | * | 3/2003 | Suzuki et al. ................ 455/112 |
| 6,650,199 B2 | * | 11/2003 | Dobrovolny ................. 333/103 |
| 6,782,239 B2 | * | 8/2004 | Johnson et al. ............... 455/42 |
| 6,799,028 B2 | * | 9/2004 | Bauer .......................... 455/321 |
| 6,810,233 B2 | * | 10/2004 | Patsiokas ................... 455/3.02 |
| 2002/0058475 A1 | | 5/2002 | Patsiokas |
| 2003/0071698 A1 | | 4/2003 | Dobrovolny |

* cited by examiner

Primary Examiner—Pablo N. Tran
(74) Attorney, Agent, or Firm—MacMillan, Sobanski & Todd, LLC

(57) ABSTRACT

An RF modulator/switch selectably couples a locally generated and conducted RF signal or an antenna RF signal to a broadcast radio receiver. A local RF input receives the conducted RF signal. An antenna RF input receives the antenna RF signal in response to a radiated RF broadcast in a broadcast band. A resonant network has a first node coupled to the antenna RF input and has a resonant frequency corresponding to the broadcast band. A first relay has a first output selectably coupled to either the antenna RF input or a second node of the resonant network. A second relay has a second output selectably coupled to either the local RF input or the first output of the first relay. When the second relay selects the local RF input then the first relay selects the second node of the resonant network and when the second relay selects the first output of the first relay then the first relay selects the antenna RF input.

20 Claims, 5 Drawing Sheets

RF MODULATOR AND SWITCH HAVING HIGH ANTENNA ISOLATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to RF modulators used for coupling audio signals to an audio reproduction system via an RF antenna input, and, more specifically, to an RF modulator system having high isolation of the receiving antenna input when the modulator is operating.

RF modulators are used for coupling an audio signal into an audio system via its radio tuner when an auxiliary input to the audio system is not available. In an automotive audio system, for example, it may be desired to install a multimedia accessory such as a DVD player, a video cassette player, or a CD disk changer so that audio signals from the accessory can be heard over the speakers of the vehicle audio system. A head unit for such a system may often lack an available auxiliary input for receiving an accessory audio signal. The modulator modulates the accessory audio signal according to the modulation scheme used by a radio reception band of the radio tuner (e.g., FM) so that an auxiliary input in the audio system becomes unnecessary.

The modulated accessory signal may be coupled to the input of the radio tuner by short-range wireless broadcasting (i.e., through the air) or by a direct hardwired connection to the radio receiver's antenna input. When a hardwired connection is employed, a relay is typically used so that only the antenna or the modulator are connected to the antenna input at one time. The relay separates the radio frequency output of the modulator from the vehicle receiving antenna to help prevent the broadcast of the modulated accessory signal from the antenna when the modulator is operating. Disconnecting the antenna from the antenna input of the radio receiver while the modulator is operating also reduces interference from radio stations broadcasting on the same or nearby frequencies as the modulator.

A typical RF modulator may operate using frequency modulation at the lower end of the FM broadcast band. The frequency may be selectable between several standard FM channels (e.g., 87.9 MHz and 88.1 MHz) to avoid using a channel that is also being used by a local radio station transmitter. Even when a direct connection of the RF modulator to the antenna input is made via a relay, however, it has continued to be desirable or even necessary to use a modulator frequency different from any local broadcast stations because the broadcast signal has continued to be picked up at the antenna input thereby causing interference even without a direct antenna connection.

Due to the size and construction of the mechanical relays or micro-relays used for switching the antenna or the RF modulator to the antenna input of the radio receiver, incomplete isolation between all the terminals of the relay is achieved. Specifically, leakage capacitance and leakage inductance between terminals of the relay allows 1) radio broadcast signals to be coupled from the antenna line to the radio's antenna input thereby causing interference, and 2) modulated accessory signals to be coupled from the modulator to the antenna line thereby causing unintended RF emissions.

SUMMARY OF THE INVENTION

The present invention has the advantage of providing extremely high isolation between the reception antenna and both the modulator and the antenna input of the audio system, whereby interference and RF emissions are greatly reduced and the need for selectable frequencies in the modulator and the associated costs are eliminated.

In one aspect of the invention, RF switch is provided for selectably coupling an internally generated RF signal or an RF signal from an antenna to a broadcast radio receiver. An antenna RF input receives the vehicle antenna RF signal in response to a radiated RF broadcast in a broadcast band. A resonant network has a first node coupled to the antenna RF input and has a resonant frequency corresponding to a selected carrier frequency in the broadcast band. A first relay has a first output selectably coupled to either the antenna RF input or a second node of the resonant network. A second relay has a second output selectably coupled to either the local RF input or the first output of the first relay. When the second relay selects the internally generated RF input then the first relay selects the second node of the resonant network and when the second relay selects the first output of the first relay then the first relay selects the antenna RF input.

DETAILED DESCRIPTION OF PREFERRED EMBODIMENTS

Figure 1:
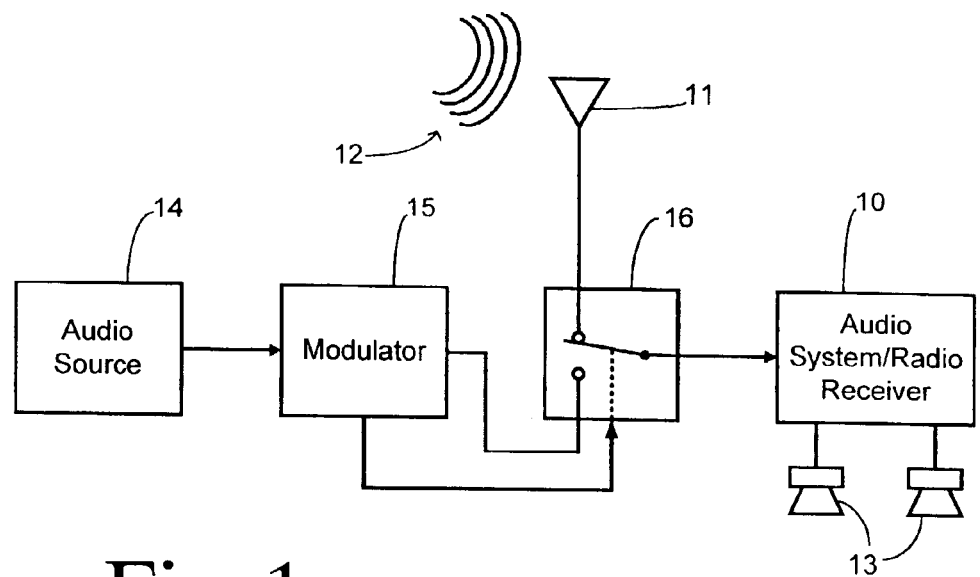
FIG. 1 is a block diagram showing a prior art hardwired RF modulator wherein normal radio reception is selected.

Referring to FIG. 1, an audio system 10 includes a radio receiver and has an antenna input for connecting to an antenna 11 that is deployed to receive radio broadcast signals 12. Radio broadcasts are selected and demodulated by the radio receiver and the resulting audio is amplified and then reproduced by speakers 13.

In order to reproduce signals from an audio source 14 without needing an additional input to audio system 10, a modulator 15 and a relay 16 are provided. FIG. 1 shows relay 16 in a position to select signals from antenna 11 for presentation to the antenna input of audio system 10. Modulator 15 is typically inactive while the antenna is selected, so that no local RF signal is being generated.

Figure 2:
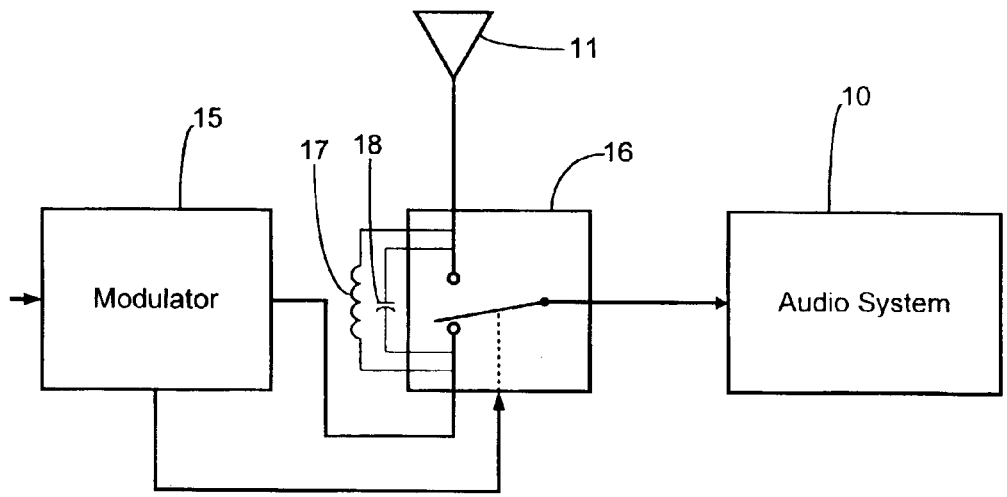
FIG. 2 is a block diagram showing the RF modulator of FIG. 1 wherein a modulated accessory signal is selected.

FIG. 2 shows relay 16 in a position to select modulated signals from modulator 15 for presentation to the antenna input of audio system 10. Thus, a local RF signal from modulator 15 and an antenna RF signal are both present at relay 16. Due to the size and construction of relay 16, a leakage or parasitic inductance 17 and a leakage or parasitic capacitance 18 are present between the antenna input terminal of relay 16 and the other terminals of relay 16. The leakage tends to create cross-coupling such that 1) undesired radio broadcast signals from the antenna propagate to the radio receiver thereby causing interference with the local RF signal from modulator 15, and 2) the local RF signal from modulator 15 propagates to antenna 11 creating unwanted RF emissions that may interfere with other nearby receivers.

Figure 3:
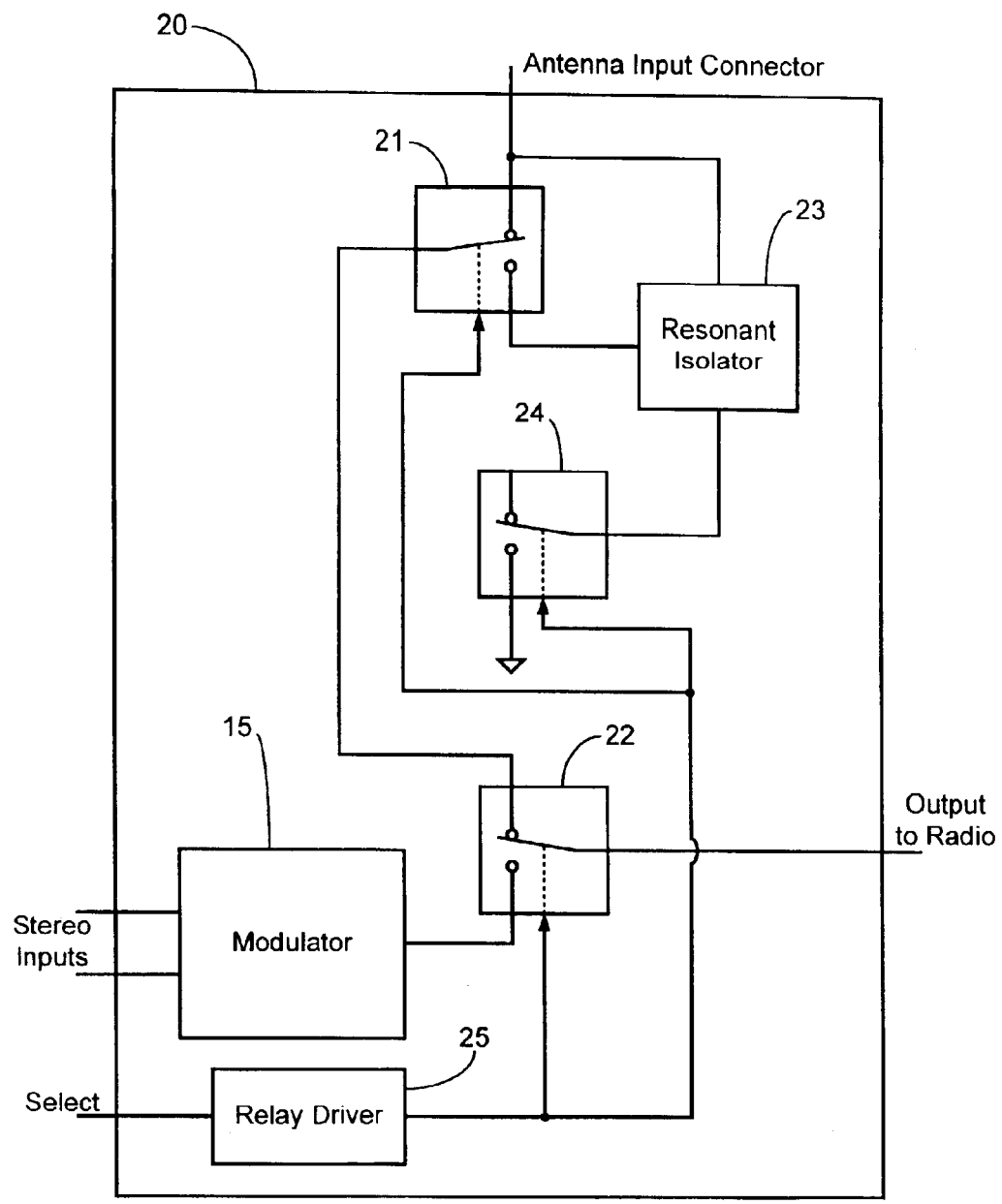
FIG. 3 is a block diagram showing a preferred embodiment of an RF modulator/RF switch according to the present invention.

FIG. 3 shows a preferred implementation of the present invention for avoiding the foregoing problems. A modulator/switch unit 20 may be constructed as a separate module for connecting to a reception antenna, an accessory audio source, and a radio receiver. A relay 21 has its output connected to one input of a relay 22. Relay 21 has one input connected to an antenna input connector of unit 20 and to a first node of a resonant isolator 23. The other input of relay 21 is connected to a second node of resonant isolator 23. Resonant isolator 23 has a ground node which is selectably connected to ground via a relay 24. A relay driver 25 drives relays 21, 22, and 24 in common. To receive a radio broadcast from the antenna, the relays are positioned as shown so that relay 21 selects the antenna connector, relay 22 selects the output of relay 21 for connecting to the antenna input of the radio receiver, and relay 24 disconnects resonant isolator 23 from ground. Thus, resonant isolator 23 electrically floats so that it does not affect the antenna signals passing through modulator/switch unit 20.

To reproduce an accessory audio signal, relays 21, 22, and 24 are switched to their opposite positions (from those shown in FIG. 3) so that relay 21 selects the second node of resonant isolator 23, relay 22 selects the output of modulator 15, and relay 24 connects the ground node of resonant isolator 23 to ground so that resonant isolator 23 becomes active. The cross-coupling of signals to and from the antenna connector via the leakage inductance and capacitance that would otherwise occur is negated by the action of resonant isolator circuit 23 which becomes connected across the open terminals of relay 21. Due to the construction of resonant isolator 23, any signal tending to propagate in either direction via the leakage inductance and capacitance is canceled out.

Figure 4:
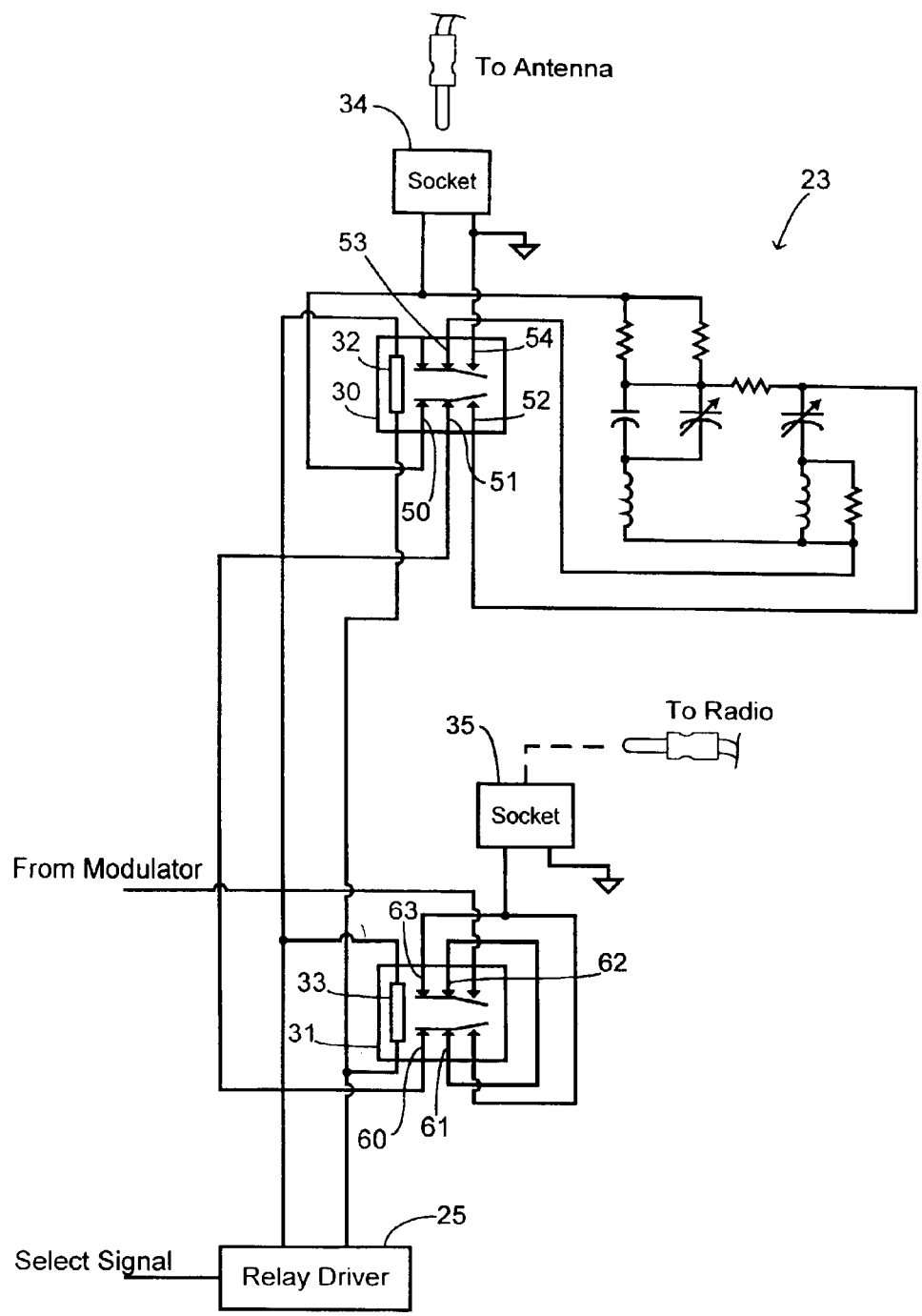
FIG. 4 is a schematic diagram showing the modulator/switch in greater detail and configured to select normal radio reception.

FIG. 4 shows the relays and the resonant circuit in greater detail. A pair of double-pole, double-throw relays 30 and 31 are commonly controlled by relay driver 25 which is connected to magnetic actuators 32 and 33, respectively. One half of relay 30 acts as the first relay for selectably connecting an antenna signal at a terminal 50 or a resonant isolator signal at a terminal 52 to a relay output terminal 51. The other half of relay 30 is used to selectably connect isolator 23 to ground. The two halves of relay 31 are connected in series to act as a single-pole, double-throw relay for outputting either the antenna signal or the modulator signal to the socket for connecting to the antenna input of the radio receiver. The series connection decreases the effective capacitance of relay 31, thereby increasing the impedance.

In the antenna mode shown in FIG. 4, antenna signals from a reception antenna are switched through the unit via an antenna socket 34, through terminals 50 and 51 to relay 31, and through terminals 60, 61, 62, and 63 of relay 31 to a socket 35 having a cable connection to the antenna input of the radio receiver.

Figure 5:
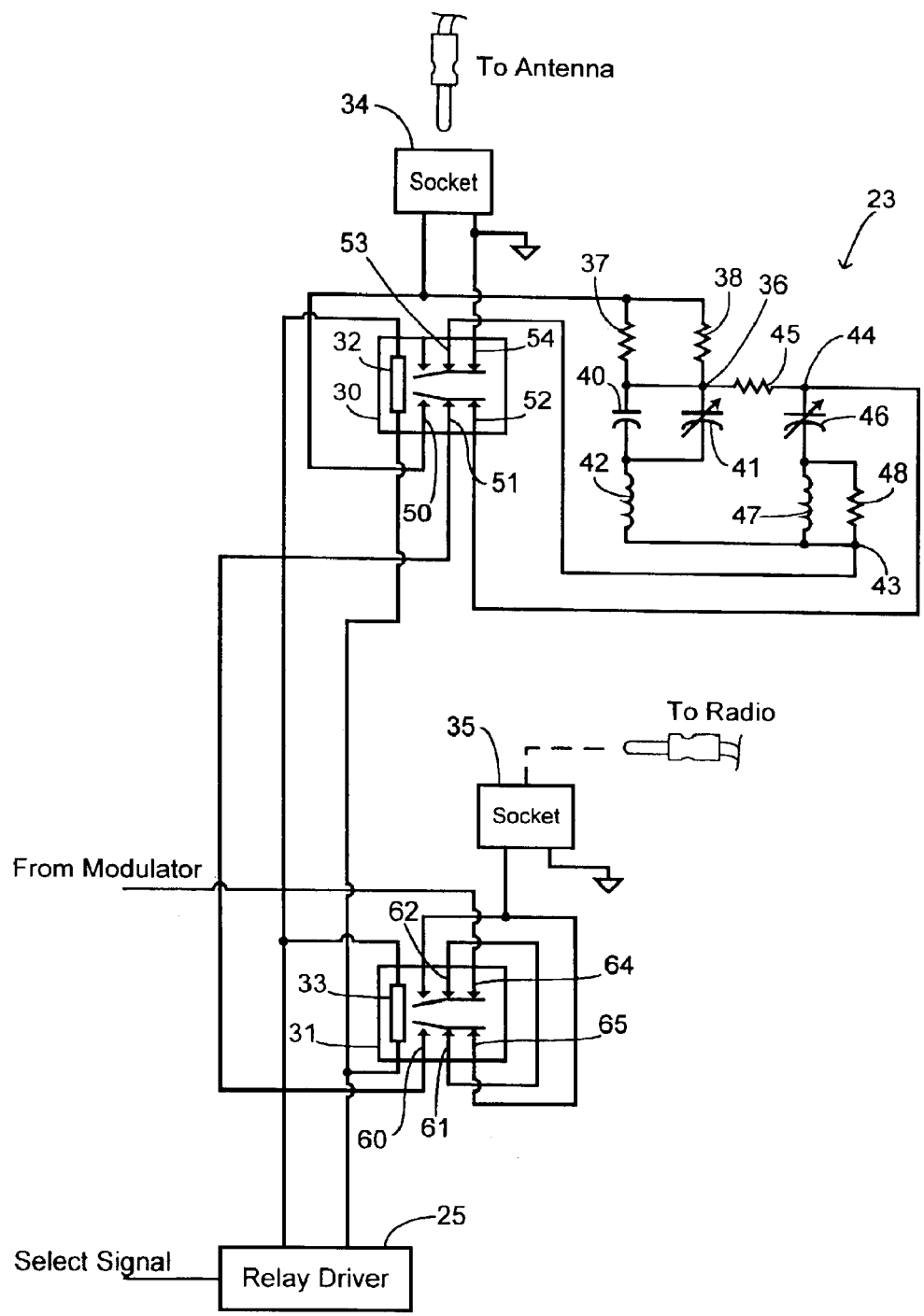
FIG. 5 is a schematic diagram showing the modulator/switch in greater detail and configured to select the output of the modulator.

In the modulator mode shown in FIG. 5, terminals 50 and 51 of relay 30 are no longer connected and, except for leakage, the antenna signal is blocked by relay 30. Since terminals 53 and 54 are switched together, a ground is now available for resonant isolator circuit 23. The antenna signal is coupled to a first node 36 of isolator 23 through parallel resistors 37 and 38. The equivalent resistance of resistors 37 and 38 is selected to closely approximate the characteristic impedance of the antenna cable connected to socket 34. Isolator 23 includes a series resonant branch connected between first node 36 and a ground node 43, and comprises parallel-connected capacitors 40 and 41 connected in series with an inductor 42.

A second node 44 of isolator 23 provides a canceling output signal to terminal 52 of relay such that there is no interfering antenna signal present at terminal 51 for propagating to relay 31. Conversely, any leakage signal of the modulator signal from relay 31 toward terminal 51 of relay 30 is canceled by isolator 23 before it can reach the antenna.

The canceling signal is generated at a second node 44 which is coupled to first node 36 by a load resistor 45. Second node 45 is coupled to ground by a nulling branch comprised of a capacitor 46 connected in series with a parallel combination of an inductor 47 and a resistor 48. In FIG. 5, the first series resonant branch and the nulling branch are independent resonant circuits which are independently adjustable by variable capacitors 41 and 46, respectively. The first series resonant branch is tuned for a minimum impedance and then the nulling branch is tuned to provide a null balance across load resistor 45. The resulting null signal which is coupled to terminals 52 and 51 of relay 30 is thus greatly attenuated (e.g., attenuation in the range of from 70 to 125 dB has been achieved). Since the resonant circuits are independently adjustable, a simple procedure can be followed wherein the first series resonant branch is adjusted to provide minimum impedance at (i.e., resonate at) the modulator frequency and then the nulling branch is adjusted to achieve a measured null at the second node. Subsequently, the first series resonant branch and the nulling branch are alternately re-adjusted to obtain further increases in attenuation.

The embodiment of FIGS. 4 and 5 is especially well suited to providing isolation for a single radio channel at a time. When a single channel modulator is used, then manual tuning of the isolator circuit is all that is necessary. If the modulator is switchable between multiple radio channels, then provision can be made to automatically re-tune the resonant circuits.

Figure 6:
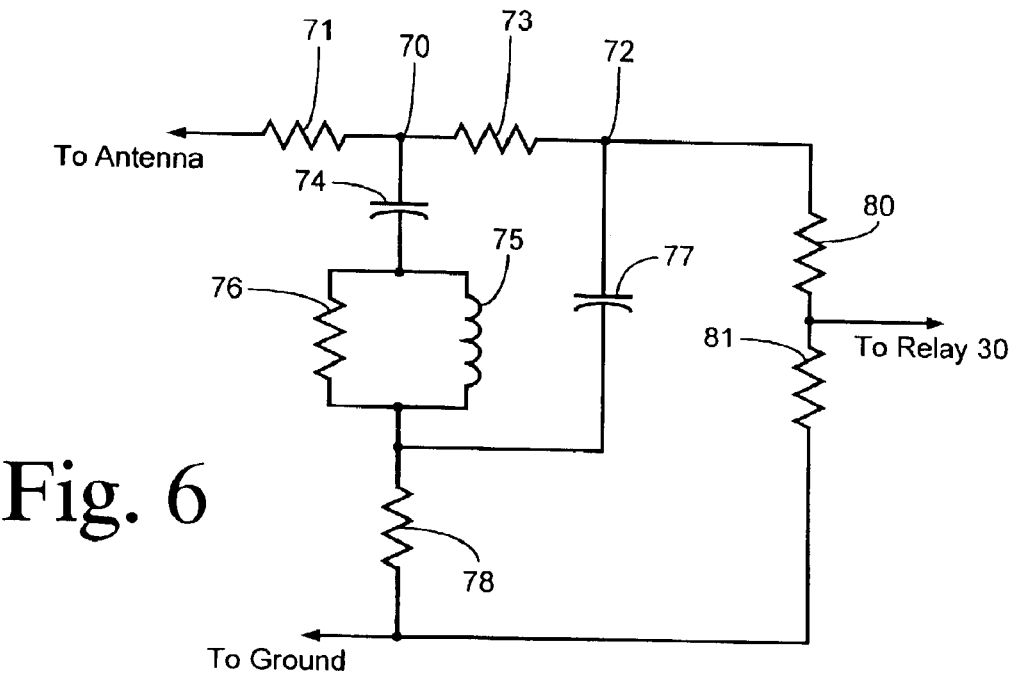
FIG. 6 is a schematic diagram showing an alternative embodiment of a resonant isolator of the present invention.

Alternatively, an isolator circuit having a wider stopband and not needing any calibration or adjustment can be provided as shown in FIG. 6. A first node 70 is coupled to the antenna by a resistor 71 and to a second node 72 by a load resistor 73. A first series resonant branch includes a capacitor 74 in series with an inductor 75. A resistor 76 is connected in parallel with inductor 75 to "de-q" or reduce the frequency selectivity of the resonant circuit. The series resonant branch is coupled to ground through a very small resistance 78 (e.g., 2 ohms) which may be provided by the resistance of the relay itself. A nulling branch includes a capacitor 77 connected between second node 72 and resistor 78. Load resistor 73 and capacitor 77 act as a phasor for generating the canceling signal at second node 72. In this embodiment, a voltage divider comprising resistors 80 and 81 is added between second node 72 and the canceling output of the isolator circuit. The voltage divider especially assists in the attenuation of modulator signals passing through the leakage inductance and capacitance of second relay 31.

Figure 7:
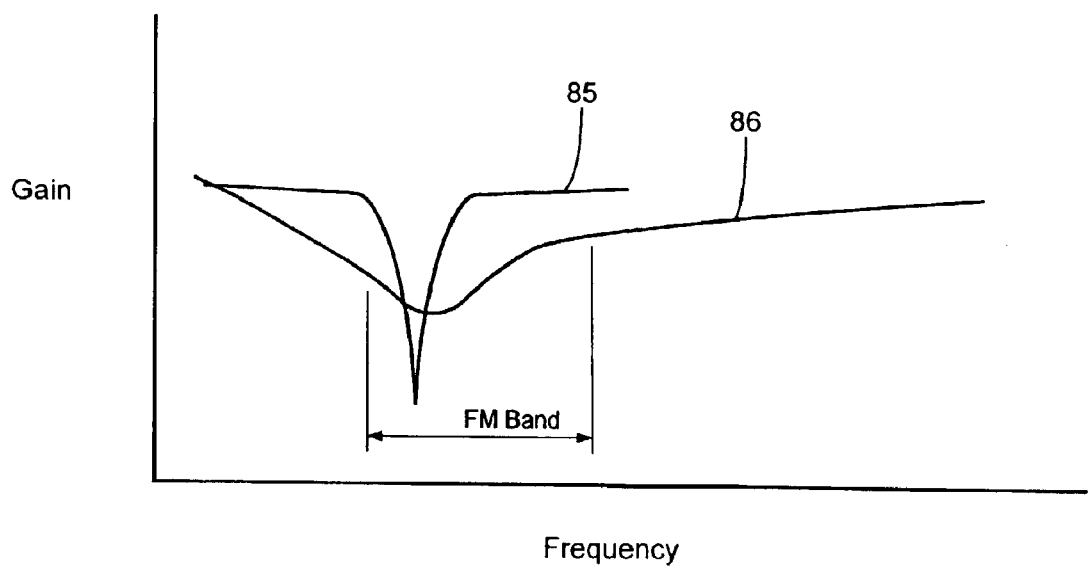
FIG. 7 is a plot showing transfer characteristics of two different embodiments of the present invention.

FIG. 7 illustrates the different modes of performance of the two different embodiments. Curve 85 shows the attenuation achieved using the more frequency-selective embodiment of FIGS. 4 and 5. Attenuation achieved using the circuit of FIG. 6 is shown by curve 86. Although less attenuation at the modulator frequency is obtained in curve 86, better overall attenuation is achieved across the full FM band. Therefore, the same resonant isolator circuit can be used with any modulator frequency without requiring any adjustment or circuit calibrations. Furthermore, the attenuation is still great enough that the modulator can operate without interference even in areas where a radio broadcaster is present at the modulator frequency. Therefore, a less costly modulator without the capability of using multiple modulating frequencies can be used exclusively.

What is claimed is:

1. An RF switch for selectably coupling a locally-generated RF signal or an antenna RF signal to a broadcast radio receiver, said RF switch comprising:
   a local RF input for receiving said locally-generated RF signal;
   an antenna RF input for receiving said antenna RF signal responsive to a radiated RF broadcast in a broadcast band;
   a resonant network having a first node coupled to said antenna RF input and having a resonant frequency corresponding to said broadcast band;
   a first relay having a first output selectably coupled to either said antenna RF input or a second node of said resonant network; and
   a second relay having a second output selectably coupled to either said local RF input or said first output of said first relay;
   wherein when said second relay selects said local RF input then said first relay selects said second node of said resonant network and when said second relay selects said first output of said first relay then said first relay selects said antenna RF input.

2. The switch of claim 1 wherein said resonant network further includes a ground node for selectably coupling to ground when said first output of said first relay is selectably coupled to said second node of said resonant network.

3. The switch of claim 2 wherein said resonant network comprises:
   a series resonant branch for coupling between said first node and said ground node and tuned to provide a minimum impedance at said resonant frequency.

4. The switch of claim 3 wherein said resonant network further comprises:
   a nulling branch coupled in parallel with said series resonant branch and between said second node and said ground node.

5. The switch of claim 4 wherein said resonant network further comprises:
   a load resistance coupled between said series resonant branch and said nulling branch.

6. The switch of claim 4 wherein said nulling branch comprises a capacitor.

7. The switch of claim 6 wherein said nulling branch further comprises an inductor connected in series with said capacitor.

8. The switch of claim 6 wherein said resonant network further comprises a voltage divider coupled between said load resistance and said ground, said voltage divider having an output coupled to said first relay.

9. The switch of claim 4 wherein said series resonant branch and said nulling branch each include a variable impedance for adjusting their resonant frequencies.

10. The switch of claim 9 wherein said variable impedances are comprised of variable capacitors.

11. Apparatus for coupling an audio signal from an audio source to an audio system via an antenna input to a radio tuner of said audio system, comprising:
   a modulator for receiving said audio signal and generating a modulated signal with a reception band of said radio tuner;
   an antenna RF input for coupling to an antenna for receiving radiated RF broadcasts in said reception band;
   a resonant network having a first node coupled to said antenna RF input and having a resonant frequency corresponding to said reception band;
   a first relay having a first output selectably coupled to either said antenna RF input or a second node of said resonant network; and
   a second relay having a second output selectably coupled to either said modulator or said first output of said first relay; and
   a relay driver for activating said first and second relays so that when said second relay selects said modulator then said first relay selects said second node of said resonant network and when said second relay selects said first output of said first relay then said first relay selects said antenna RF input.

12. The switch of claim 11 further comprising a third relay and wherein said resonant network further includes a ground node for selectably coupling to ground via said third relay when said first output of said first relay is selectably coupled to said second node of said resonant network.

13. The switch of claim 12 wherein said resonant network comprises:
   a series resonant branch for coupling between said first node and said ground node and tuned to provide a minimum impedance at said resonant frequency.

14. The switch of claim 13 wherein said resonant network further comprises:
   a nulling branch coupled in parallel with said series resonant branch and between said second node and said ground node.

15. The switch of claim 14 wherein said resonant network further comprises:
   a load resistance coupled between said series resonant branch and said nulling branch.

16. The switch of claim 14 wherein said nulling branch comprises a capacitor.

17. The switch of claim 16 wherein said nulling branch further comprises an inductor connected in series with said capacitor.

18. The switch of claim 16 wherein said resonant network further comprises a voltage divider coupled between said load resistance and said ground, said voltage divider having an output coupled to said first relay.

19. The switch of claim 14 wherein said series resonant branch and said nulling branch each include a variable impedance for adjusting their resonant frequencies.

20. The switch of claim 19 wherein said variable impedances are comprised of variable capacitors.

* * * * *